United States Patent
Schumacher et al.

(10) Patent No.: US 7,617,689 B2
(45) Date of Patent: Nov. 17, 2009

(54) COMBUSTOR DOME ASSEMBLY INCLUDING RETAINING RING

(75) Inventors: Jurgen C. Schumacher, Phoenix, AZ (US); Frank J. Zupanc, Phoenix, AZ (US); Paul R. Yankowich, Phoenix, AZ (US); Ronald B. Pardington, Gilbert, AZ (US)

(73) Assignee: Honeywell International Inc., Morristown, NJ (US)

(*) Notice: Subject to any disclaimer, the term of this patent is extended or adjusted under 35 U.S.C. 154(b) by 513 days.

(21) Appl. No.: 11/367,282

(22) Filed: Mar. 2, 2006

(65) Prior Publication Data

US 2007/0214791 A1 Sep. 20, 2007

(51) Int. Cl.
*F02C 7/20* (2006.01)
*F23R 3/14* (2006.01)

(52) U.S. Cl. .............................. 60/800; 60/748; 239/399
(58) Field of Classification Search .................... 60/748, 60/800; 239/399
See application file for complete search history.

(56) References Cited

U.S. PATENT DOCUMENTS

| | | | | |
|---|---|---|---|---|
| 2,690,213 | A * | 9/1954 | Collinson | 239/417 |
| 3,853,273 | A * | 12/1974 | Bahr et al. | 60/748 |
| 4,044,553 | A * | 8/1977 | Vaught | 60/748 |
| 4,180,974 | A * | 1/1980 | Stenger et al. | 60/748 |
| 4,365,470 | A | 12/1982 | Matthews et al. | |
| 4,454,711 | A | 6/1984 | Ben-Porat | |
| 5,117,637 | A | 6/1992 | Howell et al. | |
| 5,463,864 | A | 11/1995 | Butler et al. | |
| 5,490,378 | A * | 2/1996 | Berger et al. | 60/748 |
| 5,577,379 | A | 11/1996 | Johnson | |
| 5,630,319 | A | 5/1997 | Schilling et al. | |
| 5,737,921 | A | 4/1998 | Jones et al. | |
| 5,916,142 | A | 6/1999 | Snyder et al. | |
| 5,970,716 | A | 10/1999 | Forrester et al. | |
| 6,314,739 | B1 | 11/2001 | Howell et al. | |
| 6,581,386 | B2 | 6/2003 | Young et al. | |
| 6,758,045 | B2 | 7/2004 | Dimov et al. | |
| 2003/0010034 | A1 * | 1/2003 | Baudoin et al. | 60/748 |
| 2005/0081528 | A1 * | 4/2005 | Howell et al. | 60/748 |

* cited by examiner

*Primary Examiner*—Ted Kim
(74) *Attorney, Agent, or Firm*—Ingrassia Fisher & Lorenz, P.C.

(57) ABSTRACT

A retaining ring is provided for use in conjunction with a carburetor assembly having a flow passage therethrough for conducting a fuel-air mixture into a combustion chamber, the carburetor assembly comprising an air flow modifier and a fuel injector receiving element adjacent thereto. The retaining ring comprises a collar configured to engage the fuel injector receiving element so as to maintain its position adjacent the air flow modifier, and a retaining portion coupled to the collar and configured to engage the air flow modifier to secure the airflow modifier to the combustion chamber. The retaining portion cooperates with the collar to form an aperture through the retaining ring for receiving the carburetor assembly.

13 Claims, 5 Drawing Sheets

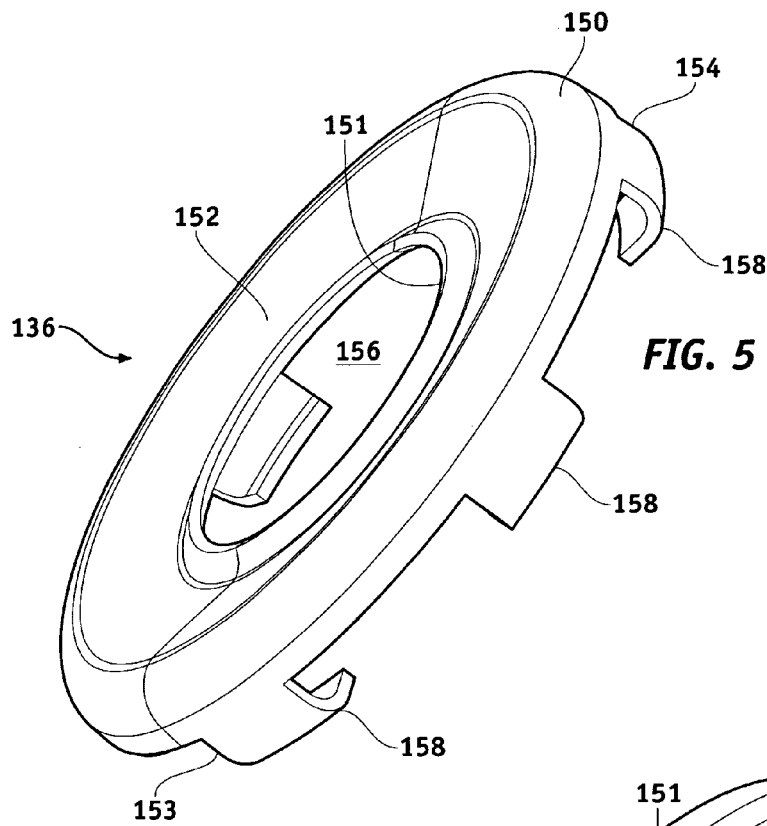
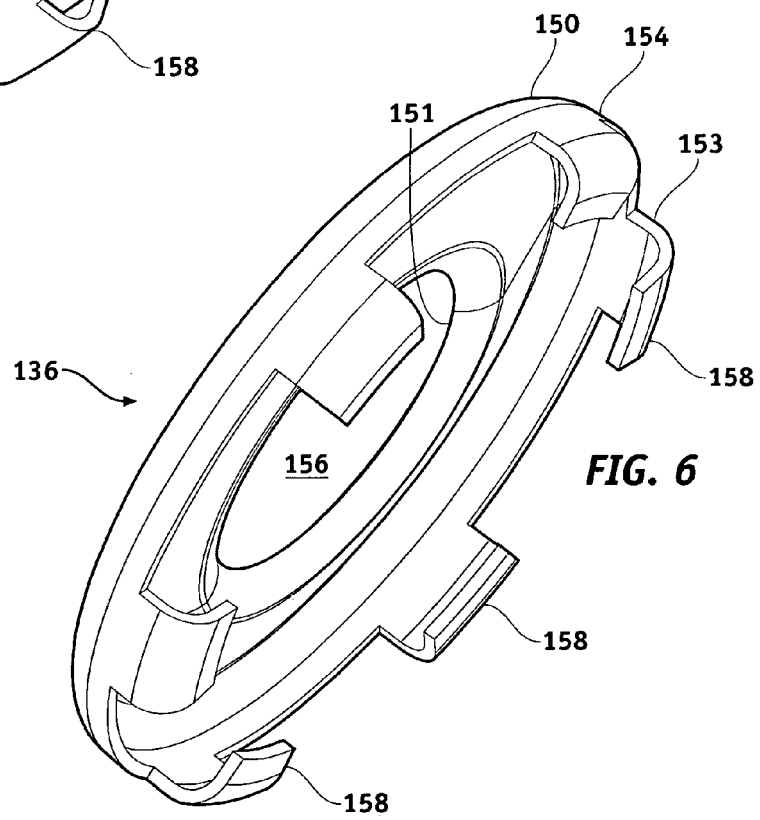

COMBUSTOR DOME ASSEMBLY INCLUDING RETAINING RING

TECHNICAL FIELD

The present invention relates to gas turbine engines and, more particularly, to a combustor dome assembly including a retaining ring for simultaneously capturing and aligning the components of the combustor dome assembly.

BACKGROUND

Gas turbine (GT) engines, which are commonly deployed on aircraft, derive energy by igniting a mixture of fuel and air within a combustion chamber to drive turbines that power the engine's compressor. The combustor system of one known GT engine includes a combustion chamber having a combustor dome assembly that comprises a heat shield and an annular housing section having multiple apertures therethrough. A carburetor assembly is disposed through each of the apertures and supplies a mixture of fuel and air to the interior of the combustion chamber for combustion therein. Each of the carburetor assemblies comprises a fuel-injector receiving portion and an air flow modulator, which may be formed as an integral part of the combustor's heat shield. The fuel-injector receiving portion may take the form of, for example, a trumpet or bell that matingly receives a hook-shaped fuel injector within its mouth. The air flow modulator includes a plurality of circumferential veins that extends from an outer annular surface to an inner annular surface. These veins receive air from one or more compressors and direct it into the interior of the air flow modulator where the air is mixed with injected fuel. The combustible fuel-air mixture is then delivered into the combustion chamber and ignited. Ideally, the air flow modulator receives the compressed air at a uniform pressure along its outer surface to minimize cross-flow and turbulence, though this is not often the case in actual practice.

In the past, the injector bellmouth, the swirler/heat shield assembly, and the combustor dome were rigidly coupled together using, for example, a welding or brazing process. This rigid type of coupling, however, is not designed to accommodate the spatial displacement that may occur between various parts of the combustion system due to thermal expansion. For example, the combustor dome and the swirler/heat shield assembly are heated by the combustive gases and may move relative to the fuel injector and fuel injector bellmouth, which remain relatively cool during combustion. To better accommodate the differences in thermal expansion, alternative coupling means have been developed that employ various components (e.g., retaining rings, clips, etc.) to secure and align the swirler/heat shield assembly with the combustor dome and the injector bellmouth, while simultaneously permitting limited movement between the injector bellmouth and the combustor dome and swirler/heat shield assembly. Though overcoming some of the disadvantages associated with welding and brazing, such "flexible" coupling means employ multiple components and, consequently, are relatively complex and expensive to manufacture and install.

In view of the above, it should be appreciated that it would be desirable to provide a retaining means for use in conjunction with a combustor dome assembly that employs relatively few components and that is relatively simple and inexpensive. In addition, it should be appreciated that it would be desirable that such a retaining means to condition the compressed air supplied by the engine's compressors so as to provide a more uniform velocity around the circumference of the swirler and, consequently, increase combustion system performance. Furthermore, other desirable features and characteristics of the present invention will become apparent from the subsequent detailed description of the invention and the appended claims, taken in conjunction with the accompanying drawings and this background of the invention.

BRIEF SUMMARY

A retaining ring is provided for use in conjunction with a carburetor assembly having a flow passage therethrough for conducting a fuel-air mixture into a combustion chamber, the carburetor assembly comprising an air flow modifier and a fuel injector receiving element adjacent thereto. The retaining ring comprises a collar configured to engage the fuel injector receiving element so as to maintain its position adjacent the air flow modifier, and a retaining portion coupled to the collar and configured to engage the air flow modifier to secure the airflow modifier to the combustion chamber. The retaining portion cooperates with the collar to form an aperture through the retaining ring for receiving the carburetor assembly.

The foregoing and other objects, features and advantages of the preferred retaining ring assembly will be apparent from the following more particular description of a preferred embodiment of the invention, as illustrated in the accompanying drawings.

BRIEF DESCRIPTION OF THE DRAWINGS

The preferred exemplary embodiment of the present invention will hereinafter be described in conjunction with the appended drawings, where like designations denote like elements, and:

FIGS. 5 and 6 are top and bottom isometric views, respectively, of a retaining ring similar to those shown in FIGS. 2-4.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
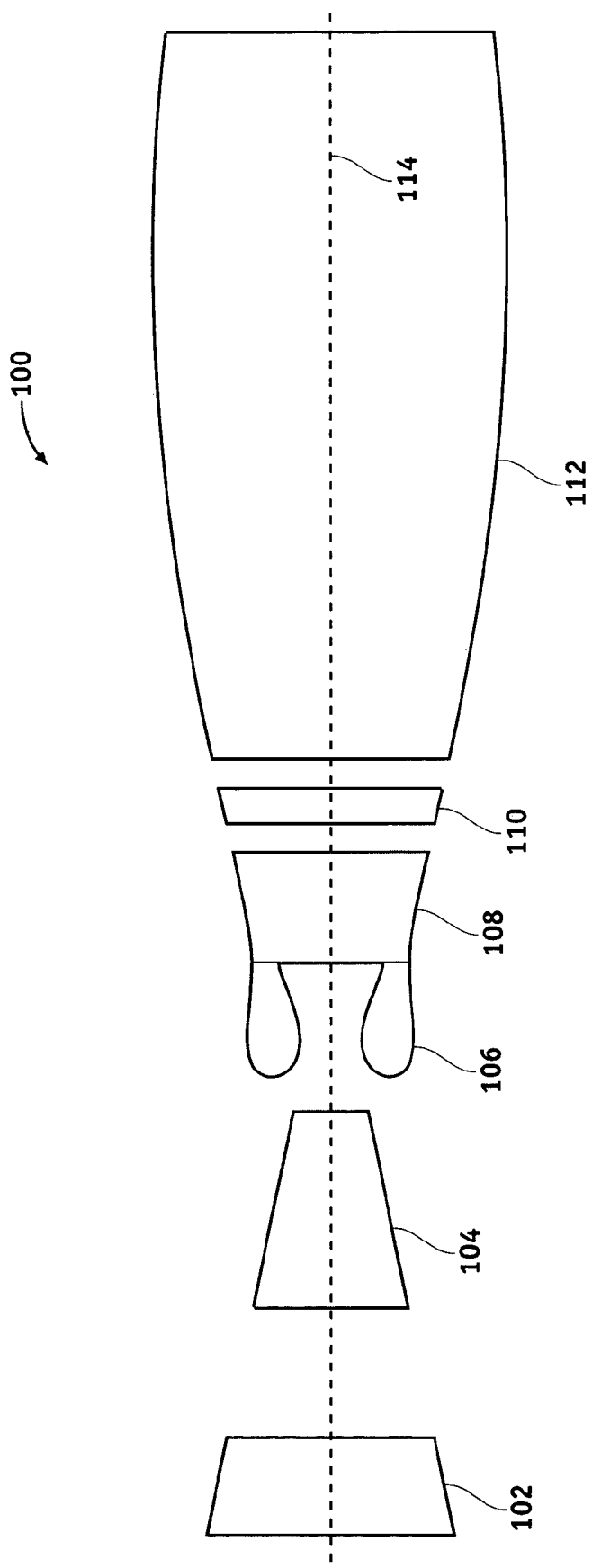
FIG. 1 is a simplified cross-sectional view of a gas turbine engine.

FIG. 1 is a simplified cross-sectional illustration of a gas turbine engine 100 comprising a low pressure compressor 102, a high pressure compressor 104, a combustor 106, a high pressure turbine 108, a low pressure turbine 110, and a nozzle 112, which are fixedly coupled together along a longitudinal axis 114. During operation of engine 100, air is supplied by compressors 102 and 104 to an upstream portion of combustor 106 wherein the air is mixed with fuel supplied by a plurality of fuel injectors (not shown). The fuel-air mixture is ignited within a combustion chamber of combustor 106 to produce a rapid increase in the temperature, velocity, and volume of the surrounding gas, which then drives turbines 108 and 110 before exiting engine 100 through nozzle 112.

Figure 2:
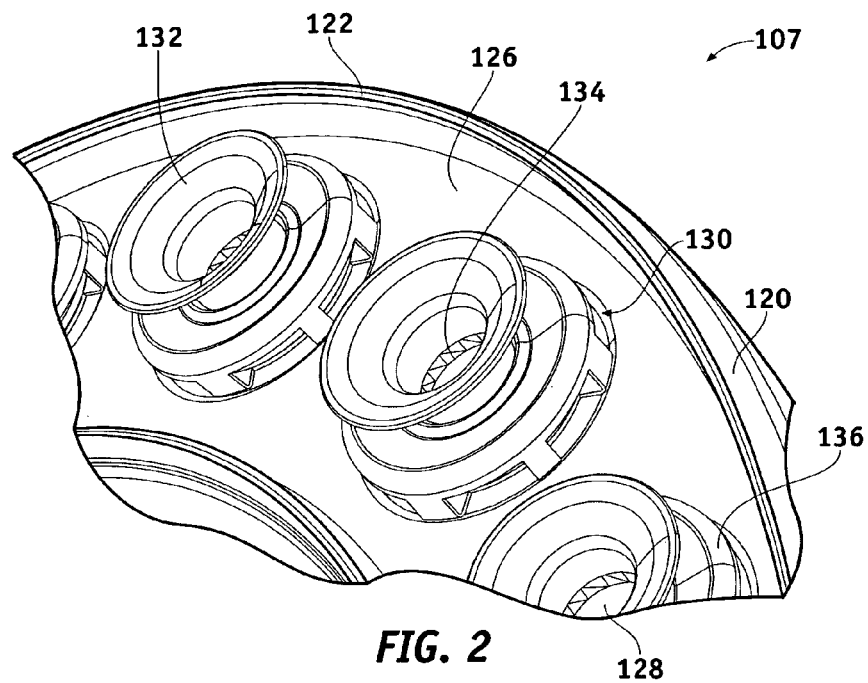
FIG. 2 is an isometric view of a portion of a combustor dome assembly including a plurality of retaining rings in accordance with a first embodiment of the present invention.
Figure 3:
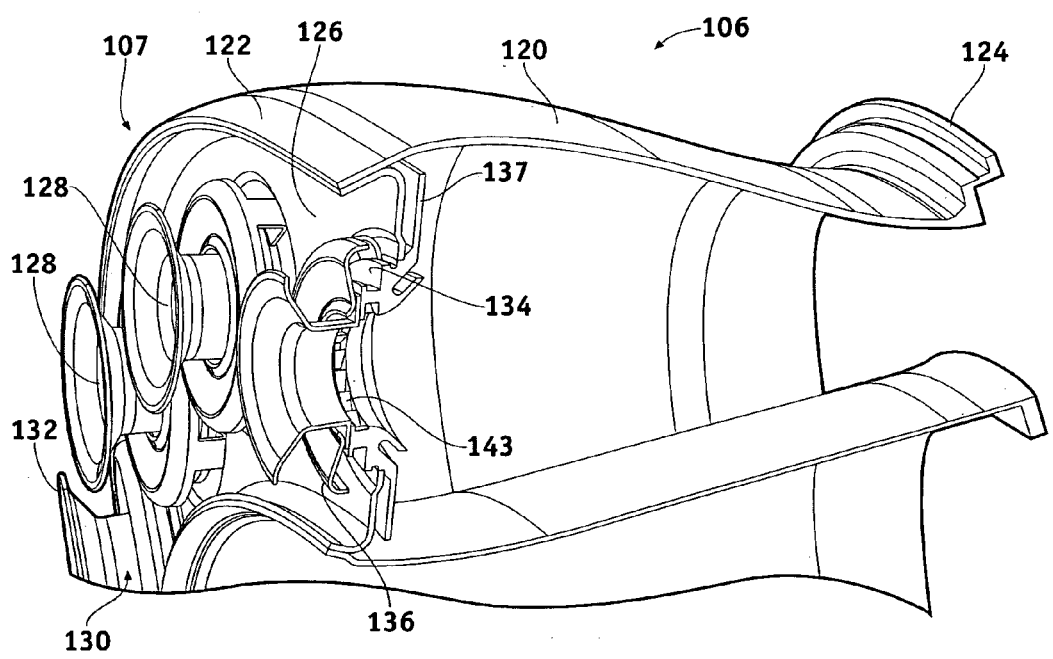
FIGS. 3 and 4 are cross-sectional views of the combustor dome assembly shown in FIG. 2.

FIGS. 2 and 3 are isometric and cross-sectional views of a portion of combustor 106. It may be seen in these illustrations that combustor 106 comprises a combustion chamber housing 120 having an upstream end 122 and a downstream end 124 (shown in FIG. 3). A combustion dome assembly 107 is disposed proximate upstream end 122 and comprises an annular housing section 126 through which a plurality of orifices 128 is provided. Orifices 128 are angularly dispersed around longitudinal axis 114 of combustor 106 (FIG. 1). A carburetor assembly 130 is disposed through each of orifices 128 comprising a fuel-injector receiving element 132, an air flow modifier 134, and a retaining ring 136, each of which is described in detail below. Carburetor assembly 130 is configured to facilitate mixing of the air passing through air flow modifier 134 with the fuel injected into element 132, and includes a flow passage therethrough for conducting the fuel-air mixture into combustion chamber housing 120.

Figure 4:
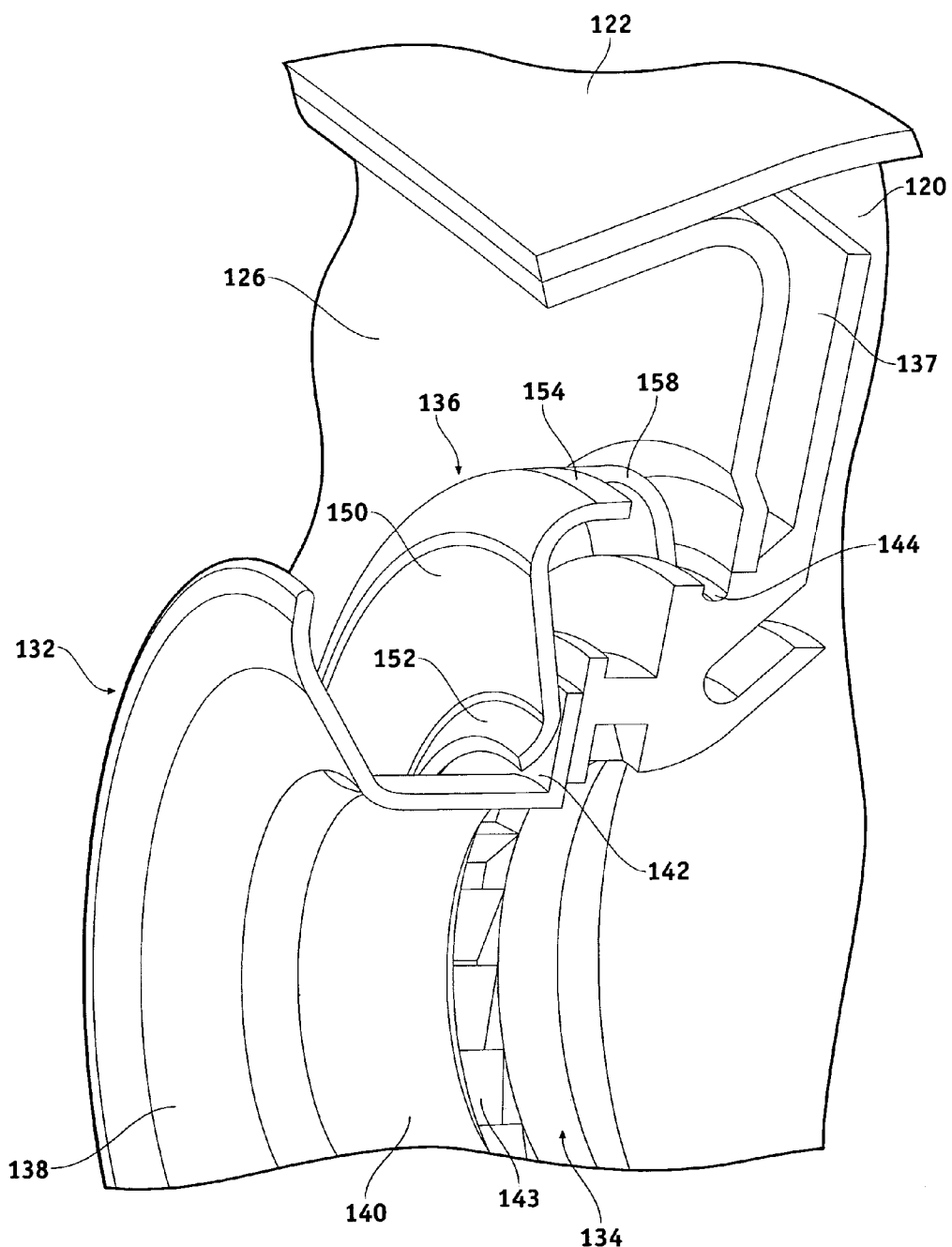

FIG. 4 illustrates each of the components of carburetor assembly 130 in greater detail. As can be seen, fuel-injector receiving element 132 may be provided with a bell-shaped or trumpet-shaped body and may thus be referred to as an injector bellmouth. Bellmouth 132 includes a mouth portion 138, a generally tubular throat portion 140, and a flange portion 142 extending radially outward from the downstream end of throat portion 140. When disposed within carburetor assembly 130, bellmouth 132 abuts air flow modifier 134 proximate flange portion 142. A fuel injector (not shown), which may have a hook-like shape, is mating received within mouth 138 and introduces fuel into throat 140 of fuel-injector receiving element 132. The injected fuel travels through throat 140 and exits proximate flange portion 142 and subsequently mixes with air provided through air flow modifier 134 as described in the following paragraph.

Air flow modifier 134 is disposed proximate orifice 128 provided through combustor dome housing 126. If desired, air flow modifier 134 may be fixedly coupled to a heat shield 137 (shown in FIGS. 2-4) that protects combustor dome assembly 107 from extreme temperatures during combustion. During assembly, the air flow modifier/heat shield assembly may be positioned by slipping each modifier 134 through its respective orifice 128 prior to attachment of annular dome housing section 126 to combustion chamber housing 120. The air flow modifier/heat shield assembly may then be secured in relation to annular dome housing section 126 and, therefore, combustion chamber housing 120 via retaining ring 136 as described in detail herein below.

Air flow modifier 134 includes a series of circumferential veins 143 that receive compressed air from compressors 102 and 104 along an outer radial surface of modifier 134. Veins 143 function to alter the flow characteristics of the compressed air in the well-known manner and direct the air into orifice 128 just downstream of the bellmouth 132. Fuel injected into bellmouth 132 is thus mixed with the air supplied by air flow modifier 134 proximate orifice 128 and is subsequently ignited within the housing 120. To create a more combustible fuel-air mixture, air flow modifier 134 may be configured to impart a spiral flow to the compressed air. For this reason, air flow modifier 134 is commonly referred to as a swirler and will be referred to as such hereafter. In accordance with one embodiment of the present invention, swirler 134 may be provided with one or more depressions proximate orifice 128. As is most clearly shown in FIGS. 3 and 4, this depression may take the form of a circumferential groove 144. As will be seen, groove 144 is configured to receive a portion of retaining ring 136, which may secure swirler 134 to annular dome housing section 126 and to combustion chamber housing 120.

FIGS. 5 and 6 are top and bottom isometric views, respectively, of retaining ring 136 shown in FIGS. 2-4. Retaining ring 136 is generally torroidal in shape and is preferably machined from an alloy (e.g., a nickel or cobalt based steel alloy) that is durable at high temperatures. Retaining ring 136 comprises three general portions: an intermediate region 150, an upstream or collar portion 152 extending from intermediate region 150 to an edge 151, and a downstream or retaining portion 154 extending from a substantially opposite side of intermediate region 150 (relative to collar portion 152) to an edge 153. In the exemplary embodiment shown in FIGS. 2-6, intermediate region 150 comprises a generally annular section, collar portion 152 comprises an inner periphery or rim, and retaining portion 154 comprises a series (e.g., six) of circumferentially spaced prongs 158 each having a foot portion curling inward relative to intermediate region 150. Edges 151 and 153 cooperate to form an aperture 156 through ring 136. When ring 136 is disposed within carburetor assembly 130 (as is most clearly shown in FIG. 4), swirler 134 passes through aperture 156 proximate edge 153 and throat 140 of bellmouth 132 passes through aperture 156 proximate edge 151. Preferably, the diameter of aperture 156 proximate edge 151 is chosen to be substantially larger than the outer diameter of throat 140 such that an annular gap is created there between. For example, the diameter of aperture 156 proximate edge 151 may be approximately 1.010" and the outer diameter of throat 140 may be approximately 0.850". By providing such an annular gap, ring 136 may be configured to better accommodate any movement occurring during combustion between bellmouth 132 and the remainder of combustor dome assembly 107 (e.g., swirler 134) as a result of thermal expansion and contraction.

As shown in FIGS. 3 and 4, prongs 158 of retaining portion 154 engage circumferential groove 144 of swirler 134 when retaining ring 136 is deployed within combustion dome assembly 107. If desired, one or more of prongs 158 may be welded or brazed to swirler 134 to provide additional coupling. Prongs 158 abut annular housing section 126 near their extremities and thus prevent swirler 134 from disengaging from combustion chamber housing 120. In this way, retaining ring 136 performs a first capture function by securing swirler 134 relative to annular housing section 126 and, therefore, combustion chamber housing 120. Additionally, ring 136 preforms a second capture function; collar portion 152 of retaining ring 136 engages flange 142 to maintain bellmouth 132 adjacent swirler 134. Thus, it should be appreciated that, when installed, ring 136 simultaneously captures and aligns the components of combustor dome assembly 107 (e.g., bellmouth 132 and swirler 134) relative to each other and to combustion chamber housing 120. Retaining ring 136 may be manufactured in multiple semicircular or arcuate sections (e.g., two halves), which are disposed around bellmouth 132 and welded or brazed together during installation.

In accordance with the present invention, intermediate region 150 and/or portions 152 and 154 of the retaining ring may be configured so as to condition the flow of the compressed air supplied by compressors 102 and 104 (FIG. 1) and received by swirler 134 (FIGS. 2-4) thereby increasing the overall performance of gas turbine engine 100 (FIG. 1). For example, ring 136 shown in FIGS. 2-6 may help regulate the air flow uniformity along the outer surface of swirler 134 by deflecting directly impinging flow and adverse cross-flow velocity components. To enhance this regulatory effect, the inventive retaining ring may be provided with a series of apertures that permit a controlled airflow through the retaining ring and to swirler 134. One such retaining ring is described in more detail below in conjunction with FIGS. 7-9.

Figure 7:
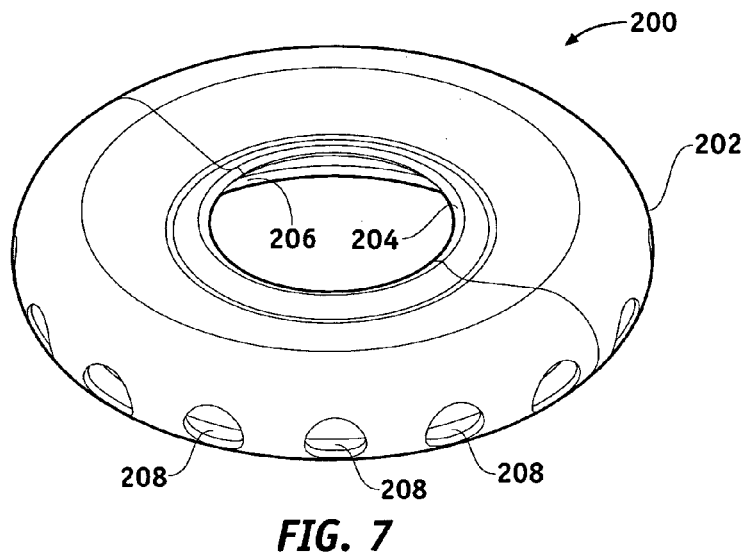
FIGS. 7, 8, and 9 are top isometric, bottom isometric and cross-sectional views, respectively, of a retaining ring in accordance with a second embodiment of the present invention.
Figure 8:
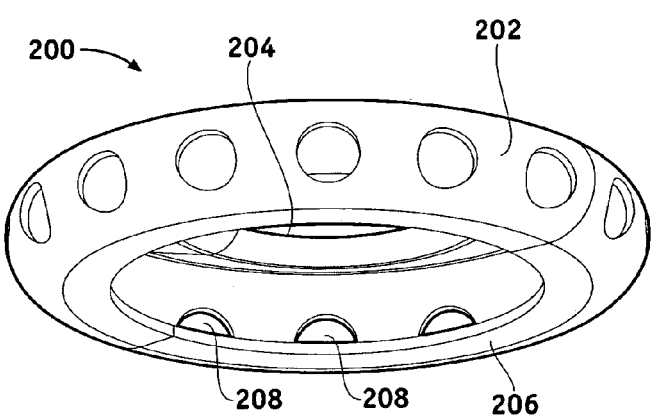
Figure 9:
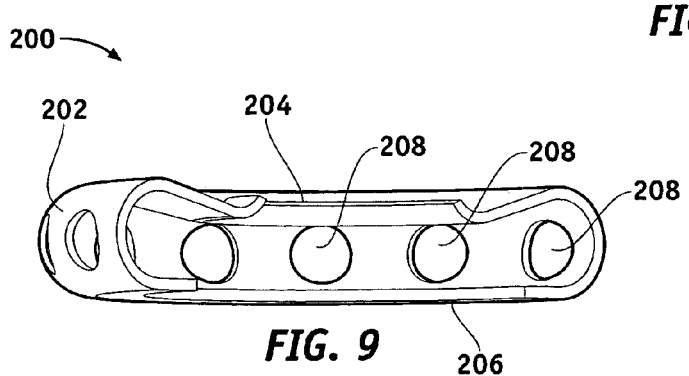

FIGS. 7, 8, and 9 illustrate a retaining ring 200 in top isometric, bottom isometric, and cross-sectional views, respectively, in accordance with a second embodiment of the present invention. As does retaining ring 136 (described above in conjunction with FIGS. 2-6), retaining ring 200 has a generally torroidal shape and comprises an intermediate region 202, an upstream or collar portion 204, and a downstream or retaining portion 206. In this particular embodiment, portions 204 and 206 each comprise a substantially annular collar having an aperture therethrough. When ring 200 is installed around, for example, carburetor assembly 130 (FIGS. 2-4), collar portion 204 receives throat 140 of bellmouth 132 and retaining portion 206 engages circumferential groove 144 of swirler 134 in the manner described above. A series of apertures 208 (e.g., sixteen) is provided through intermediate region 202 along the circumference of retaining ring 200. Each aperture 208 may have, for example, a circular profile. Collectively, apertures 208 permit a controlled airflow through ring 200 and to the exterior of swirler 134. Thus, when installed, ring 200 not only simultaneously captures and aligns the components of combustor dome assembly 107 (e.g., bellmouth 132 and swirler 134), but also regulates the air received from compressors 102 and 104 (FIG. 1) so as to provide a more uniform air flow velocity along the outer surface of swirler 134 and, consequently, increase the overall performance of gas turbine engine 100 (FIG. 1).

The retaining ring may be coupled to the remainder of combustor dome assembly 107 (FIGS. 2-4) in a variety of ways. For example, the retaining ring may be manufactured in multiple segments that are installed around bellmouth 132 and subsequently fixedly coupled together. Retaining ring 200 may be manufactured in multiple semicircular or arcuate sections (e.g., two C-shaped halves each similar to that shown in FIG. 9), which are disposed around bellmouth 132 and welded or brazed together during installation. Alternatively, if comprised of a resilient material, the retaining ring may be formed as one integral piece and press-fit over flange portion 142 of bellmouth 132 and/or swirler 134.

In view of the above, it should be appreciated that a simplified retaining means for use in conjunction with a combustion system has been provided. In addition, it should be appreciated that a retaining means that conditions the compressed air delivered to the swirler so as to provide a more uniform velocity around the circumference thereof and, therefore, increased combustion system performance. While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

The invention claimed is:

1. A carburetor assembly for use in conjunction with a fuel injector, the carburetor assembly comprising:
   an air flow modifier having a circumferential groove in an outer surface thereof;
   a bellmouth, comprising:
   a mouth portion configured to receive the fuel injector therein; and
   a radial flange downstream of the mouth portion and fixedly coupled thereto; and
   a retaining ring, comprising:
   a collar abutting an upstream face of the radial flange; and
   a retaining portion downstream of the collar and fixedly coupled thereto, the retaining portion engaging the circumferential groove of the air flow modifier to physically hold the radial flange of the bellmouth against an upstream end of the airflow modifier.

2. A carburetor assembly according to claim 1 wherein the air flow modifier includes a plurality of circumferential veins generally circumscribed by the retaining ring.

3. A carburetor assembly according to claim 1 wherein the retaining ring includes multiple openings therethrough for permitting the passage of air to the air flow modifier.

4. A carburetor assembly according to claim 3 wherein the multiple openings are circumferentially located around an intermediate region of the retaining ring.

5. A carburetor assembly according to claim 1 wherein the radial flange of the bellmouth contacts the upstream end of the air flow modifier.

6. A carburetor assembly according to claim 1 wherein the circumferential groove extends entirely around the outer surface of the air flow modifier.

7. A carburetor assembly according to claim 1 wherein the bellmouth includes a throat portion extending into, and wherein the retaining ring is configured to receive the throat through an aperture provided through the retaining ring.

8. A carburetor assembly according to claim 7 wherein the aperture has a diameter greater than the bellmouth proximate the collar to accommodate movement due to thermal expansion and contraction.

9. A carburetor assembly according to claim 1 wherein the retaining ring is comprised of multiple segments fixedly coupled together.

10. A carburetor assembly for use in conjunction with a fuel injector, the carburetor assembly comprising:
    an air swirler for modifying airflow, the air swirler having a circumferential groove formed in an outer surface thereof; and
    a bellmouth adjacent the air swirler and configured to matingly receive the fuel injector, the bellmouth comprising:
    a mouth portion configured to receive the fuel injector therein; and
    a radial flange downstream of the mouth portion and fixedly coupled thereto; and
    a retaining ring, comprising:
    an upstream collar abutting the upstream face of the radial flange;
    a downstream collar circumferentially engages the circumferential groove formed in the air swirler; and
    a substantially annular intermediate region between the upstream collar and the downstream collar;
    wherein the retaining ring physically captures the radial flange of the bellmouth against an upstream end of the air swirler.

11. A carburetor assembly according to claim 10 wherein the intermediate region includes a plurality of openings circumferentially spaced there around for permitting the passage of air to the air swirler.

12. A carburetor assembly according to claim 10 wherein the bellmouth includes a throat portion extending through the upstream collar and into the throat portion.

13. A carburetor assembly for use in conjunction with a fuel injector of a gas turbine engine, the carburetor assembly comprising:
   a bellmouth, comprising:
      a mouth portion configured to receive the fuel injector therein; and
      a radial flange fixedly coupled to the mouth portion and disposed downstream thereof;
   an air swirler adjacent the radial flange;
   a circumferential groove provided in an outer surface of the air swirler; and
   a retaining ring disposed around the radial flange and an upstream portion of the swirler, the retaining ring engaging the circumferential groove to physically capture the radial flange of bellmouth against the upstream end of the air swirler.

\* \* \* \* \*

UNITED STATES PATENT AND TRADEMARK OFFICE
CERTIFICATE OF CORRECTION

| | | |
|---|---|---|
| PATENT NO. | : 7,617,689 B2 | Page 1 of 1 |
| APPLICATION NO. | : 11/367282 | |
| DATED | : November 17, 2009 | |
| INVENTOR(S) | : Schumacher et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 597 days.

Signed and Sealed this

Nineteenth Day of October, 2010

David J. Kappos
*Director of the United States Patent and Trademark Office*